April 15, 1969   C. M. WESTBROOK   3,438,088
CONTROL FOR MAINTAINING UNIFORM GAUGE ON BLOWN FILM
Filed Jan. 19, 1967
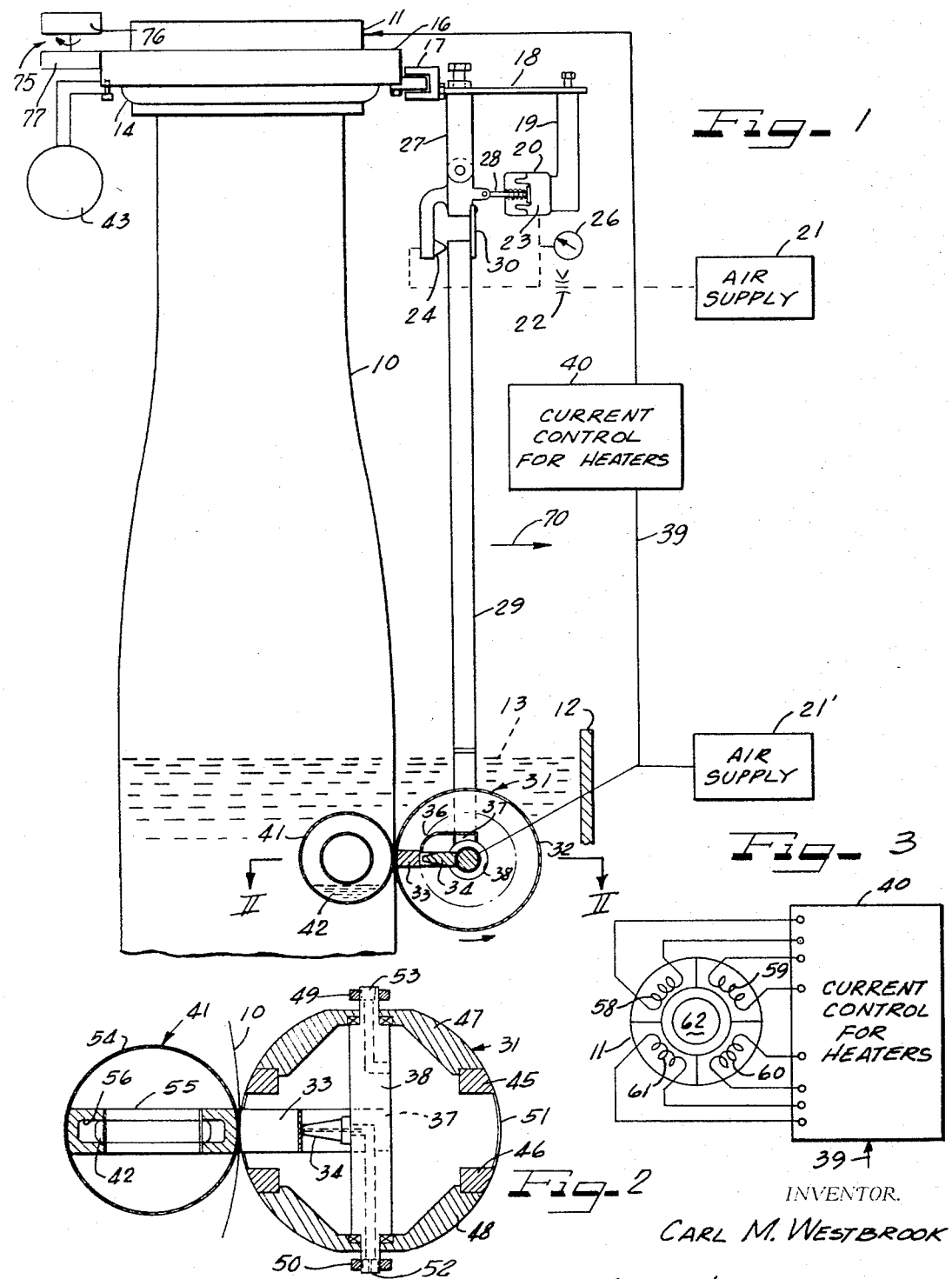
INVENTOR.
CARL M. WESTBROOK
BY Hill, Sherman, Meroni, Gross & Simpson
ATTORNEYS

United States Patent Office 3,438,088
Patented Apr. 15, 1969

3,438,088
CONTROL FOR MAINTAINING UNIFORM GAUGE ON BLOWN FILM
Carl M. Westbrook, Beloit, Wis., assignor to Beloit Corporation, Beloit, Wis., a corporation of Wisconsin
Filed Jan. 19, 1967, Ser. No. 610,364
Int. Cl. B29d 23/04, 7/22
U.S. Cl. 18—14      17 Claims

ABSTRACT OF THE DISCLOSURE

The thickness of a moving tubular plastic film is detected and controlled by a magnet and a magnetic sensor which are disposed on opposite sides of the film and below the surface of a cooling liquid. The distance between these two attractable bodies is translated into control signals for the extruding apparatus.

---

This invention relates generally to a film gauge sensing and control apparatus, and particularly to an apparatus for sensing and controlling the gauge of an extruded tubular film which is subsequently pressed by rollers to form a web having two layers.

The manufacture of a hollow plastic film is a continuous process, and for reasons of economy, the process must be one by which plastic film can be made accurately at a relatively high speed. Therefore, there exists the need for a sensing in the control device which continuously senses the gauge of an extruded tubular film with a high degree of accuracy, and which device is relatively simple in construction. In the manufacture of hollow plastic film, it is desirable that sensing and control devices be sensitive to slight variations of the parameter being sensed and yet provide uniform control of the manufacturing process which is in control of the parameter being sensed so as to restore the parameter being sensed to its desired condition.

In the manufacture of extruded tubular film, a plastic resin is extruded from a die in substantially cylindrical shape. The film which leaves the die is somewhat yieldable and stretchable. However, as the film continues to be conveyed away from the die it is cooled whereupon the film is somewhat yieldable but substantially non-stretchable. At this point, the gauge or thickness of the film is fixed. Therefore, for better and more uniform control of film thickness it is desirable that a sensor be positioned so as to sense deviations of film gauge with respect to the desired gauge of the film at some point after the film has been cooled and to develop control signals in response to such deviations which are subsequently applied to suitable control means associated with the extruding die so as to restore the film thickness to its predetermined desired dimension.

Therefore, one of the primary objects of the present invention, particularly from a manufacturing standpoint, is to provide a reliable and simple sensing and control apparatus for the manufacture of film, which will sense film thickness and provide suitable control signals which will compensate for deviations of film thickness from a predetermined dimension.

Another object of the present invention is to provide a film gauge sensing device which is sensitive to slight variations in the thickness of the film and which sensing device is reliable and inexpensive.

Still another object of the present invention is to provide a film gauge sensing and control apparatus which will automatically compensate for variations in the position of the film being sensed.

A feature of the present invention is the use of a magnetic responsive sphere which is positioned within the interior of the cylindrical film and a magnetic sensor positioned exteriorly of the film so as to attract the sphere thereto.

Another feature of the present invention is the use of a traversing magnetic sensor which orbits the cylindrical film so as to sense the gauge of the film about the entire periphery of the cylindrical film.

Briefly, the sensing and control apparatus of the present invention includes an annular rotatable flange which is mounted on an extruding head. Secured to the flange is an extended shaft which carries a pneumatically operated pressure sensing device. A magnetic sensor is resiliently suspended from the pressure sensing device by an arm which has one end thereof in proximity with a metering orifice of the pneumatic pressure sensing device. As the magnetic sensor is pressed against the surface of the moving cylindrical film, the portion of the arm in proximity with the metering orifice is displaced relative to the orifice thereby varying the static pressure within the air line connected to the orifice. The variations in static pressure from the desired pressure in the line is used to vary the position of the magnetic sensor which is suspended by the pressure sensing device to maintain a constant pressure between the magnetic sensing device and the surface of the film being sensed. The magnetic sensor is extended below the surface of a cooling liquid to insure contact with the film surface when the film is substantially non-stretchable. A sphere which is responsive to a magnetic field is positioned within the interior of the cylindrical film and its density is selected to be equal to the density of the cooling liquid so as to float below the surface of the cooling liquid and is held in place by the magnetic field of the magnetic sensor.

Since the sphere within the cylindrical film is selected to have the same density as that of the cooling liquid it is substantially weightless. Therefore, the only forces acting upon the sphere are the magnetic forces produced by the magnetic sensing device which is positioned exteriorly of the film. The magnetic forces will attract the sphere toward the sensing device and the sphere will follow the sensing device through its orbital sensing path about the cylindrical film.

The magnet of the magnetic sensing device is resiliently mounted within the sensing device and has a portion thereof in proximity with a metering orifice which also is positioned within the sensing device. The sphere within the cylindrical film is attracted toward the magnet of the magnetic sensor and separated thereby by the thickness of the film passing between the sphere and the sensor. Variations in film thickness will cause the magnet within the sensor to be attracted toward the sphere within the film to greater or lesser degrees depending on the thickness of the film. Therefore, the portion of the magnet in proximity with the metering orifice within the sensor will change its position relative to the metering orifice to develop a control signal indicative of film thickness. The control signal is then delivered to a current control which controls the power delivered to certain ones of a plurality of heating units within the extruding head to control the flow of film therethrough at certain regions around the periphery of the cylindrical film thereby controlling film thickness.

The invention, however, will be more fully realized and understood from the following detailed description when taken in conjunction with the accompanying drawings in which like reference numerals throughout the various views of the drawings are intended to designate similar elements or components and wherein:

FIGURE 1 is an elevational view of a film gauge sensing and control apparatus constructed in accordance with the principles of this invention and wherein air connections and electrical connections are illustrated schematically;

FIGURE 2 is a sectional view taken along the line of II—II of FIGURE 1; and

FIGURE 3 is a simplified schematic diagram of the heating elements positioned within the extruding head of FIGURE 1.

On the drawings:

As seen in FIGURE 1, an extruded tubular film 10 is originated at an extruding head 11 and delivered to a cooling tank 12. The tank 12 contains a supply of cooling liquid 13, which for example may be water. There is provided suitable means for supplying the cooilng liquid within the tubular film to maintain the liquid level at both the interior and exterior of the film substantially the same.

The extruding head 11 has an annular support flange 14 for supporting a rotatable ring 16 about the extruding head 11. Secured to the outer periphery of the ring 16 is a bracket 17 which, in turn, supports a shaft 18 which extends radially outwardly of the ring 16. A mounting bracket 19 is adjustably secured to the shaft 18 and supports a pneumatically operated actuator 20.

An air supply 21 is connected through a reducing valve 22 to a pressure chamber 23, of the actuator 20, and to a metering orifice 24. A pressure indicator 26 is connected in the air line between the chamber 23 and metering orifice 24 to give visual indication of the static pressure within the line.

The metering orifice 24 is connected to a mounting bracket 27 which, in turn, is slidably carried on the shaft 18 and movable relative thereto by an actuating arm 28 of the actuator 20. Therefore, variations in static pressure within the chamber 23 will cause the mounting bracket 27 to slide on the shaft 18.

A support arm 29 is suspended from the mounting bracket 27 and secured thereto by means of a leaf spring 30. The upper portion of the support arm 29 is in proximity with the opening of the metering orifice 24 so as to restrict air flow from the orifice, thereby causing a static pressure within the chamber 23.

A magnetic sensing device 31 is secured to the lower end of the support arm 29 and extends below the surface of the cooling liquid 13. The magnetic sensor 31 includes a spherical shell 32 of non-magnetic material for containing a resiliently mounted magnet 33 which has a portion thereof in proximity with a metering orifice 34. The magnet 33 is carried by a resilient L-shaped spring 36 which, in turn, is secured to a mounting block 37 on a shaft 38. As the position of the magnet 33 varies with respect to the metering orifice 34 variations and static pressure within a line 39 are effected. These variations or control signals are delivered to a current control unit 40 which converts the static pressure signals to current signals for controlling the amount of heating current delivered to certain ones of a plurality of heating elements positioned within the extruding head 11. The metering orifice 34 and the air line 39 are connected to an air supply 21.

A sphere 41 is positioned interiorly of the tubular film 10 and below the liquid level of the coolant 13. A quantity of mercury 42 is carried within the sphere 41 to increase the density of the sphere 41 to a value which is equal to the density of the cooling liquid within the tank 12. The sphere 41 has magnetic properties and is attracted toward the magnet 33 of the sensor 31. The magnet 33 is attracted toward the sphere 41 by a force which is inversely proportional to the gauge or thickness of the film 10 passing between the sensor 31 and the sphere 41. Therefore, variations of static pressure within the line 39 are effected by movement of the magnet 33 to provide control signals indicative of film thickness.

A counterbalance 43 may be secured to the ring 16 opposite the mounting bracket 17 to provide uniform rotation of the sensor 31 about the cylindrical film 10. Apparatus for rotating ring 16 about head 11 is provided generally at 75 and includes a prime mover 76 coupled to, in this particular illustration, a friction wheel 77 which bears against the edge of ring 16. Many other well known driving configurations could be coupled to ring 16, for example, a gear train could be employed between the prime mover 76 and ring 16 which could, of course, have a toothed edge.

As seen in FIGURE 2, the sensor 31 includes a pair of non-ferrous rings 45 and 46 which are secured to a pair of cup-shaped members 47 and 48 respectively. The shaft 28 extends through the cup-shaped members 47 and 48 and is journalled by bearings 49 and 50. An arcuately shaped ring 51 is secured between the rings 45 and 46 and together with the cup-shaped members 47 and 48 form the sensing sphere 31. The ring 51 is constructed of non-ferrous material.

The shaft 38 has an air inlet 52 which is in fluid communication with the metering orifice 34. Therefore, variations in position of the magnet 33 relative to the metering orifice 34 will produce variations in static pressure at the inlet 52 which, in turn, is connected to the current control 40 of FIGURE 1. To prevent static pressure buildup within the sensor 31 an air outlet 53 is provided in the shaft 38 opposite the air inlet 52, and the air outlet 53 is in fluid communication with the interior of the sensor 31.

The floating sphere 41 consists of a hollow shell 54 and a ferrous ring 55 secured within the shell 54. The ferrous ring is provided with a closed track or chamber 56 for containing the mercury 42 therein. The chamber 56 is continuous around the circumference of the ring 55 thereby allowing the mercury 42 to always fall to the bottom of the sphere 41 for proper balance thereof.

Seen in FIGURE 3 is a schematic wiring diagram of the heating elements positioned within the extruding head 11 and connected to the current control 40. Four heating elements 58, 59, 60 and 61 are positioned in quadrature relation within the extruding head 11 and each is connected to the current control 40 to be controlled separately in response to control signals received from the sensing sphere 31. By changing the temperature of the plastic resin passing through the extruding head 11 at different regions within the extruding head 11 variations in film thickness are effected. However, the current control 40 and heating elements 58, 59, 60 and 61 may be replaced by suitable mechanical control means which is connected to the center die 62 within the extruding head 11. By selectively positioning the center die 62 relative to the interior surface of the outer die variations in film thickness may be produced.

In operation.—The tubular plastic film 10 is extruded by the extruding head 11 and delivered to a cooling tank 12 which contains cooling liquid. The cooling liquid is also delivered interiorly of the film 10 in such a manner as to maintain a uniform liquid level at both the interior and exterior of the film 10. The film 10 is solidified so to speak by the cooling liquid and the gauge of the film is fixed. The magnetic sensor 31 is suspended by the resilient spring 30 and urged against the exterior surface of the film 10 with a pressure of approximately 4 ounces. It will be understood that the film 10 is continuously moving and sufficient tension is applied to the film to prevent deforming the film wall when in contact with the sensing sphere 31.

Should the diameter of the tubular film 10 increase or decrease the pressure between the film surface and the sensing sphere 31 will also increase or decrease. This action will cause the sensing sphere 31 and the support arm 29 to be deflected thereby changing the relative position of the upper portion of the support arm 31 with respect to the metering orifice 24 and change the static pressure which is sensed by the chamber 23. By way of example, should the diameter of the film 10 increase, the sensing sphere 31 will be deflected in the direction indicated by the arrow 70 to allow more air to escape from the metering orifice 24 and decrease the static pressure within the chamber 23. Therefore, the spring within the pneumatic control 20 will urge the diaphragm therein in the same direction thereby repositioning the support arm 29 and sensing sphere 31 until the specified 4 ounce pressure between the film surface and sensing sphere 31 is obtained.

As the film 10 passes between the sensing sphere 31 and the floating sphere 41, the magnet 33 is attracted toward the metal ring 55 by an amount which is proportional to the thickness of the film thereby allowing air to escape from the metering orifice 34 at some predetermined rate to provide the desired static pressure within the line 39. However, should the thickness of the film 10 increase, the sphere 41 will be urged further away from the magnet 33 thereby decreasing the magnetic attraction of the magnet 33 for the metal ring 55. This action will cause the spring 36 to urge the magnet 33 toward the metering orifice 34 to increase the static pressure within the line 39. The increased static pressure within the line 39 is converted into a current signal within the control 40 and delivered to one or more of the heating elements 58–61 within the extruding head 11. This may be accomplished by suitable slip rings, not shown, around the periphery of the extruding head 11 which are electrically connected to the current control 40 as the sensing and control apparatus rotates about the extruding head 11.

It will be understood that variations and modifications may be effected without departing from the spirit and scope of the novel concepts of this invention.

I claim as my invention:

1. A sensing and control apparatus for maintaining uniform gauge of extruded film comprising:
    an extruding head for forming a continuous film of desired gauge;
    signal producing means;
    control means connected between said signal producing means and said extruding head;
    magnet means positioned a predetermined distance from said extruding head and adjacent one surface of the film for applying a magnetic field through the film, said magnet means being movable relative to said signal producing means;
    and magnetic responsive means positioned adjacent another surface of said film opposite said magnet means for receiving the magnetic field applied through said film, whereby variation of the gauge of the film from its desired gauge is sensed between said magnet means and said magnetic responsive means to cause a corresponding change of position of said magnet means to develop a correcting signal at said signal producing means and which signal is delivered to said control means for correcting the gauge of the film to its desired gauge.

2. The apparatus of claim 1 further including a receptacle of cooling liquid for receiving the extruded film, said magnet means and said magnetic responsive means positioned below the surface of said cooling liquid.

3. The apparatus of claim 2 wherein the density of said magnetic responsive means is substantially equal to the density of the cooling liquid thereby causing said magnetic responsive means to be substantially weightless and responsive only to the forces of the magnetic field from said magnet means.

4. The apparatus of claim 3 wherein said magnetic responsive means consists of a spherical shell;
    a ring of magnetic material having a continuous annular passage, said ring secured within said shell;
    and ballast means positioned within the annular passage of said ring for maintaining said magnetic responsive means at the same density as the density of said cooling liquid.

5. The apparatus of claim 2 wherein said magnet means and said signal producing means are contained within a non-ferrous housing.

6. The apparatus of claim 5 wherein said non-ferrous housing is spherically shaped.

7. The apparatus of claim 1 wherein said signal producing means includes:
    an air supply;
    a nozzle having an orifice in proximity with said magnet means;
    an air line connected between said air supply and said nozzle for maintaining a static pressure within said air line which varies in response to the movement of said magnet means relative to the orifice of said nozzle.

8. The apparatus of claim 1 further including traversing means connected to said magnet means for traversing said magnet means across the surface of the film in a direction perpendicular to the direction of film travel, said magnetic responsive means following the movement of said magnet means due to the magnetic field of said magnet means.

9. The apparatus of claim 8 further including pressure responsive means connected to said magnet means to urge said magnet means against the surface of the film with a predetermined constant pressure.

10. The apparatus of claim 9 wherein said pressure responsive means maintains said magnet means urged against the surface of the film with a pressure of four ounces per square inch.

11. The apparatus of claim 1 further including pressure responsive means connected to said magnet means for urging said magnet means against the surface of the film with a predetermined constant pressure.

12. The apparatus of claim 11 wherein said pressure responsive means maintains said magnet means urged against the surface of the film with a pressure of four ounces per square inch.

13. The apparatus of claim 1 wherein said control means includes a plurality of electric heating elements positioned in said extruding head for controlling the temperature of the extruded film at different elemental areas of the film as the film passes from said extruding head, thereby controlling the gauge of the film at each elemental area.

14. The apparatus of claim 1 wherein said control means includes a plurality of electric heating elements positioned in said extruding head for controlling the temperature of the extruded film at different elemental areas of the film as the film passes from the extruding head, thereby controlling the gauge of the film at each elemental area;
    said signal producing means including an air supply, a nozzle having an orifice in proximity with said magnet means, an air line connected between said air supply and said nozzle for maintaining a static pressure within said air line which varies in response to the movement of said magnet means relative to the orifice of said nozzle;
    and further including means connected between said electric heating elements and said air line for converting static air pressure signals to electric current signals to energize said heating element.

15. The apparatus of claim 1 wherein said magnetic responsive means is held in place only by the force of the magnetic field of said magnet means and spaced from said magnet means a distance which is proportional to the gauge of the film.

16. The apparatus of claim 15 further including:
    an annular ring rotatably mounted on said extruding head;
    a shaft secured to said ring extending radially outwardly therefrom;
    a support bracket slidably mounted on said shaft, said support bracket having a metering orifice in fluid communication with said air supply;
a support arm having a first end thereof connected to said magnet means and a second end thereof in proximity with the metering orifice of said support bracket;
resilient means connected between said support bracket and said second end of said support arm;
and a pneumatic actuator adjustably secured to said shaft having its actuating rod mechanically connected to said support bracket and its actuating chamber in fluid communication with the metering orifice of said support bracket, whereby deviations of contact pressure from the desired pressure which is exerted on the film by said magnet means will cause said second end of said support arm to change position relative to the metering orifice of said support bracket to cause a change of static pressure within the chamber of said pneumatic actuator and reposition said magnet means against the surface of the film with the desired pressure.

17. The apparatus of claim 1 wherein said magnet means is positioned adjacent the exterior surface of the tubular film for applying a magnetic field through the film, and said magnetic responsive means is positioned adjacent the interior surface of the tubular film opposite said magnet means for receiving the magnetic field applied through the film.

References Cited

UNITED STATES PATENTS

| | | |
|---|---|---|
| 3,150,213 | 9/1964 | Doering. |
| 3,275,723 | 9/1966 | Cappuccio. |
| 3,286,302 | 11/1966 | Doering. |
| 3,296,343 | 1/1967 | Buttolph et al. |
| 3,302,241 | 2/1967 | Lemmer et al. |
| 3,368,007 | 2/1968 | Palmer. |

WILLIAM J. STEPHENSON, *Primary Examiner.*

U.S. Cl. X.R.

18—2